United States Patent [19]
Bailey

[11] 3,756,518
[45] Sept. 4, 1973

[54] APPARATUS FOR PROCESSING RESIN
[76] Inventor: Wesley T. Bailey, 700 Cloyden Rd., Palos Verdes Estates, Calif. 90274
[22] Filed: Mar. 8, 1971
[21] Appl. No.: 122,036

[52] U.S. Cl..................... 241/65, 425/202, 425/310
[51] Int. Cl. ......... B29b 1/03, B29f 3/02, B29f 3/08
[58] Field of Search .................... 241/23, 65, 101 B, 241/247; 425/6, 202, 310; 264/5, 28, 140, 142; 62/320

[56] References Cited
UNITED STATES PATENTS
3,342,040  9/1967  Dedricks et al...................... 62/320
2,609,150  9/1952  Bludeau............................ 241/65 X
2,879,005  3/1959  Jarvis............................... 241/65 X
2,919,862  1/1960  Beike et al....................... 241/65 X
3,564,650  2/1971  Irving............................. 18/12 TS Primary Examiner—Robert L. Spruill
Attorney—Sokolski & Wohlgemuth and John Holtrichter, Jr.

[57] ABSTRACT

Apparatus including an elongated mill structure having a cooling jacket wherein a resin is fed from a resin kettle directly to the mill structure in a molten state, wherein it is forced down the structure and along the structure's cool periphery to lower the temperature of the resin to its brittle temperature, and wherein the hardened resin is broken into particles of desired shape and size as a finished product.

9 Claims, 3 Drawing Figures

PATENTED SEP 4 1973 3,756,518
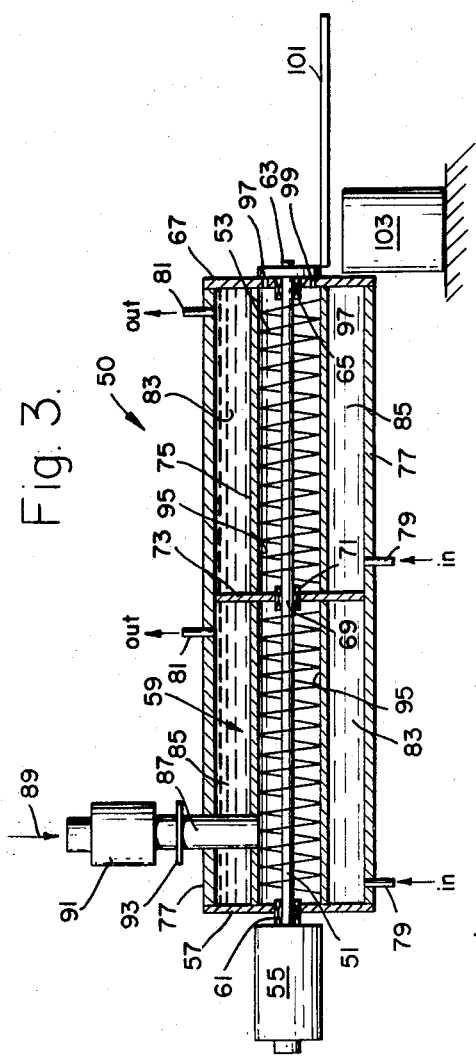
Fig. 3.
Fig. 1.
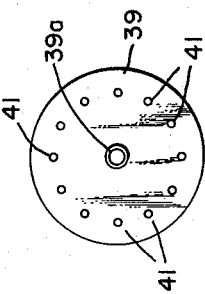
Fig. 2.
Wesley T. Bailey,
INVENTOR.
BY.
John Holbrichton Jr.
ATTORNEY.

APPARATUS FOR PROCESSING RESIN

BACKGROUND OF THE INVENTION

The background of the invention will be set forth in two parts.

1. Field of the Invention

The present invention pertains generally to the field of resin processing and more particularly to the field of processing what are commonly called "hard resins" and "thermoplastic resins".

2. Description of the Prior Art

The milling of plastic material and particularly of thermoplastic and hard resins is well known in the art. The milling procedure is used to provide improved physical properties for the shaped articles formed after this process. For example, milling helps prevent surface deterioration of shaped articles such as sheets, films and molded articles. Also, there are many instances where it is desired that the material be in the form of fine particles or particles of certain sizes and shapes. As an example, fine particles of thermoplastic material may be advantageously used in a powdered resin coating process wherein a continuous film is formed on an article without the use of a solvent. This is generally accomplished by an air suspension of the particles. The article to be coated is heated, and when it is immersed in the suspended particles, the article will be uniformly covered and no pollution of the air will have taken place since this is a solvent-less process. This process is known in the industry as "fluidized bed coang".

In the past, thermoplastic and hard resins have required different types of processes. This is because these two types of materials have rather significantly different temperature related characteristics. For example, thermoplastics have a melting point above ambient temperature and a brittle point or secondary order of transition below ambient. On the other hand, hard resins have a melting point above ambient and a brittle point below the melting point but above ambient. For a more complete description of these materials, their compositions, characteristics and known processes used therewith, reference may be made to a book by Brage Golding entitled POLYMERS AND RESINS, D. Van Norstrand C., Inc., Princeton, New Jersey, 1959, and to other related texts.

Not only have the processes used with these materials been different but they also have had severe limitations and disadvantages. In the area of thermoplastics, very expensive and intricate "closed" systems requiring vapor pressure control have been used. For example, in one such system, plastic material is milled in an enclosed system wherein the liquid vapor pressure is varied while the plastic is in contact with a boiling liquid, which has a boiling point substantially corresponding to the melting point of the plastic material at the liquid vapor pressure under which the system is operating.

In another technique, the thermoplastic material is first processed into particles of generally relatively large size and irregular shape by other processes such as described above, before being deposited in a dry hopper and then being chilled to well below the material's brittle temperature by spraying with a liquid refrigerant such as liquid nitrogen immediately prior to a grinding process accomplished under slight superatmospheric pressure. This process and the one described immediately before clearly show that a new and improved process not requiring more than a single step and not requiring elaborate and very expensive equipment would constitute a significant advancement of the art.

With respect to what are generally considered "hard resin" processes, the resin is polymerized with heat in a large resin kettle, and after being dehydrated, the molten resin is quickly run out of the kettle onto a cooling floor, which is generally a concrete slab or it may be constructed of sheet iron plates welded together to form a smooth surface. Once the resin has cooled to a brittle solid, it is manually broken up with sledge hammers into pieces which are thereafter transported to another site and ground to a coarse powder and then possibly pulverized in an impact mill. Again, it is clear that these prior art techniques lead to undesired oxidation and fumes and impurity contamination. Also, these processes are very costly, time consuming, and result in a final product which usually contains too many "fines", — small particles which are undesirable for dust and other handling reasons.

SUMMARY OF THE INVENTION

In view of the foregoing factors and conditions characteristic of the prior art, it is a primary object of the present invention to provide a new and improved apparatus and technique for processing resins, not subject to the disadvantages enumerated above.

It is another object of the present invention to provide a method for processing in a single continuous step either thermoplastic or hard resins to provide a finished particulate product.

It is still another object of the present invention to provide apparatus for processing resin in which the resin so processed is not contaminated by condensed moisture or impurities and is not subject to oxidation, and which does not require a completely closed system with elaborate vapor pressure control.

According to the present invention, apparatus for continuously processing resins to a finished particulate product immediately from a source of molten resin is provided which includes an elongated carrier having an entrance end and an exit end, and feed means operatively coupled to the entrance end of the carrier for transporting resins in a molten state from a source of such resin to the carrier. Disposed about the periphery of the carrier is a means for lowering the temperature of the resin within the carrier from the resin melting point to its brittle point. The invention also includes grinding means including a driven grinding element disposed within the carrier for moving the resin in its molten state both toward the exit end and toward the carrier's periphery to cool the resin and make it solid, and by its grinding action producing and reducing the size of particles of resin ejected at the exit end of the carrier.

The invention may include apparatus to cool the resin to its brittle temperature above ambient, as in the case of hard resins, or it may include refrigeration apparatus which will bring the temperature of the resin to its brittle temperature below ambient when working with thermoplastic resins. Also, the exit end of the carrier may be provided with an orifice fixture which determines the final size and shape of the particulate output.

The features of the present invention which are believed to be novel are set forth with particularity in the appended claims. The present invention, both as to its organization and manner of operation, together with further objects and advantages thereof, may thus be understood by making reference to the following description taken in conjunction with the accompanying drawings in which like reference characters refer to like components in the several views.

BRIEF DESCRIPTION OF THE DRAWINGS

FIG. 1 is a schematic illustration of apparatus for processing resins in accordance with the present invention;

FIG. 2 is a sectional view taken along line 2—2 of FIG. 1; and

FIG. 3 is a schematic diagram of apparatus constructed in accordance with another embodiment of the present invention.

DESCRIPTION OF THE INVENTION

With reference again to the drawing and more particularly to FIG. 1, there is shown apparatus 11 for continuously processing resins to a finished particulate product immediately from a source of molten resin. The apparatus 11 includes an elongated carrier or tube 13 having a coolant jacket 15 about its periphery 16. The tube 13 also includes an entrance end 17, an exit end 19, and a grinding element 20, disposed within the tube. The grinding element 20 is shown in FIG. 1 mechanically driven by a variable speed electric motor 21 through a conventional gearing arrangement 23. The element 20 is preferably of the "Archimedes screw" type which has the advantage of moving the material to be ground toward the tube's periphery as well as downstream toward the exit end thereof.

The coolant jacket 15 in this embodiment is provided with an inlet port 25 and an outlet port 26, both being connected by piping to a conventional coolant system (not shown), having a capacity to reduce the temperature of the material within the tube 13 by a desired amount. For example, where a "hard resin" is heated to at least its melting point (about 360°F) in a conventional resin kettle 27 by a heating system 29 connected to a source of fuel (not shown) and allowed to flow in its molten condition by opening a valve 31 in a discharge line 33 between the kettle 27 and the tube's entrance end 17, the resin will follow the path indicated by arrow 35 into the tube 13 where the grinding element 19 will convey it generally downstream and also toward the coolant jacket 15. Here the periphery of the tube is cooled by cold water flowing through the jacket 15 and the resins will be caused to change from a liquid state to a solid state within the tube as its temperature reaches the brittle point. The grinding element 20 then not only transports the now solid material downstream, but also breaks up the solid resin into a desired final saleable form, and which leaves the apparatus 11 as indicated by arrow 37.

The grinding action of the element or screw 20 may provide the desired size of particulate product by itself, or, a desired product size and shape may be accomplished by the screw 20 and tube 13 in conjunction with an orifice fixture 39 mounted at the tube's exit end 19. The orifice fixture 39 may have a single round hole, or it may have, as shown in FIG. 2, a plurality of holes 41 of any desired shape and size. The fixture also functions with the screw 20 to hold back and recycle particles reaching it which are too large.

The fixed parameters of the apparatus 11, such as the grinding element's size and pitch and the size and shape of the apertures in the orifice fixture, provide major determinations as to the characteristic of the device's output 37. However, the type and temperature of the coolant used and its flow rate as well as the speed of the screw 19 are factors which provide the apparatus 11 with a very great degree of controllability for any particular resin and for any of many types of resin. For example, the cooling means may be a refrigeration unit (not shown) which causes a conventional refrigerant liquid or a gas such as Freon to flow through the coolant jacket 15. In this way, thermoplastic materials which have a brittle point below ambient may be processed in a manner similar to that for hard resins.

In another embodiment 50 of the invention as illustrated in FIG. 3, the shaft 51 of a grinding screw 53 is directly coupled to a variable speed electric motor 55 mounted at a first end 57 of an elongated housing or tube 59. The shaft 51 is supported at the first end 57 by a bearing 61, at its downstream end 63 by a bearing 65 in a second end wall 67, and approximately at its center 69 by a center bearing 71 supported coaxially with respect to the tube 59 by a center wall 73.

The peripheral wall 75 of the tube 59 is surrounded by a cooling jacket 77 having a pair of coolant inlets 79 and a pair of coolant outlets 81 communicating with the coolant jacket's interior 83 in which a coolant 85 flows. As in the first embodiment, the type of coolant may be chosen which will sufficiently cool within the tube 59 a particular molten resin to its brittle point, the resin going through a conduit 87 from a resin kettle such as kettle 27 as indicated by arrow 89. A pump 91 may be coupled into the conduit pipe 87 by conventional means such as a flange 93 to aid the resin flow 89 from the kettle into the interior 95 of the tube 59 occupied by the revolving grinding screw 53.

The operation of the apparatus 50 is similar to that of the first embodiment described, in that the molten resin is cooled, solidified and ground within the tube 59. However, here an orifice arrangement including one or more apertures 97 in the end wall 67 and an apertured cutter 99 is mounted by any conventional means to the downstream end 63 of the shaft 51 just outside of the end wall 67. The particulate finished product may then be transported by a conventional conveyor belt 101 to a convenient location for packaging or use, or it can be deposited directly into a container 103.

It can be seen from the foregoing that the invention provides a very economical, simple, yet effective method of producing a finished particulate product in a single step by processing liquid resin directly from a resin kettle and the like. It should also be noted that there is no opportunity for the processed resin to become contaminated by impurities or water vapor, or oxidized.

There are many large volume resins now being sold which are still produced by the same archaic hand method developed many years ago. These include the phenolic resins, isophthalic polyester resins, and "hard resins" which are a group of resins in large volume including rosin-maleic, styrene-maleic, which are often used as a major ingredient in floor polishes. Also, as noted above, the group of resins known as thermoplastic resins may also be advantageously processed by the invention herein described without the use of very elaborate and costly processing systems heretofore thought to be necessary to produce a particulate product.

The materials used to fabricate the invention are not critical and any material generally considered suitable for similar functions may be utilized. Also, devices and components may be substituted for those specifically identified where similar functions are provided.

It should therefore be evident that, although the invention has been described in several embodiments, it is susceptible to modification and other embodiments. Accordingly, it is intended that the foregoing disclosure and drawings shall be considered only as illustrations of the principles of the invention.

What is claimed is:

1. An improvement in apparatus utilizing an elongate mill structure with an elongate grinding element coaxially rotatably mounted in an elongate carrier having entrance and exit ends, wherein the improvement comprises:

resin kettle means including a resin kettle for heating resins to a molten state;

feed means including a kettle discharge line disposed between and communicating with said resin kettle and said entrance end of said carrier for transporting resins in a molten state from said resin kettle means to said carrier;

cooling means disposed about the periphery of said carrier for lowering the temperature of resin within said carrier from its melting point to its brittle point; and grinding means including means driving said grinding element for moving resin in its molten state both toward said exit end of said carrier and towards said periphery thereof to be cooled and made solid, and for continuously producing and reducing the size of particles of resin ejected as a finished particulate product at said exit end of said carrier.

2. The improvement according to claim 1, wherein said grinding means also includes a variable speed motor mechanically coupled to said elongate grinding element.

3. The improvement according to claim 1, wherein said feed means also includes valve means in said discharge line for controlling the flow of said molten resin.

4. An improvement according to claim 1, wherein said grinding element is an Archimedes screw, and wherein said cooling means includes a coolant jacket disposed about said carrier, said jacket including intake and outlet port means for operationally coupling to said coolant jacket a coolant.

5. The improvement according to claim 1, wherein said grinding means further includes an orifice fixture disposed at said exit end of said carrier, said fixture including an orifice configuration determining the size and shape of the hardened resin particles furnished as said finished particulate product.

6. The improvement according to claim 5, wherein said orifice fixture includes an apertured cutter mounted on the downstream end of said elongate grinding element.

7. The improvement according to claim 1, further comprising conveyor means disposed adjacent said exit end of said elongated carrier for transporting said finished particulate product to a predetermined location.

8. The improvement according to claim 4, wherein said coolant is at a temperature lowering the temperature of resin within said carrier to its brittle point above ambient.

9. The improvement according to claim 4, wherein said coolant is refrigerated to a temperature lowering the temperature of resin within said carrier to its brittle point.

* * * * *